United States Patent [19]

Desai

[11] 4,235,806
[45] Nov. 25, 1980

[54] CATIONIC α-CYANO-P-(N-BENZYL-N-ETHYLAMINO)-CINNAMOYL DYES

[75] Inventor: Kishor A. Desai, Lock Haven, Pa.

[73] Assignee: American Color & Chemical Corporation, Charlotte, N.C.

[21] Appl. No.: 27,458

[22] Filed: Apr. 5, 1979

[51] Int. Cl.³ .............. C07C 121/78; C07D 295/14; C07D 213/02; C07D 233/56
[52] U.S. Cl. .................. 260/465 D; 542/427
[58] Field of Search ............ 260/465 D; 542/427

[56] References Cited

U.S. PATENT DOCUMENTS

| | | | |
|---|---|---|---|
| 3,742,012 | 6/1973 | Bauman | 260/465 D |
| 4,017,486 | 4/1977 | Buell et al. | 542/427 |

*Primary Examiner*—Dolph H. Torrence
*Attorney, Agent, or Firm*—Armstrong, Nikaido, Marmelstein & Kubovcik

[57] ABSTRACT

Cationic yellow methine dyes represented by the structure:

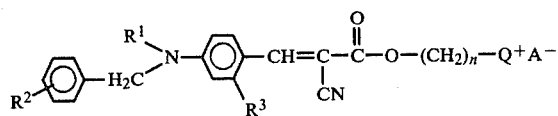

where
$R^1$ is alkyl or cyanoalkyl, said alkyl being of 1-4 carbons;
$R^2$ is H, Cl, Br or $NO_2$;
$R^3$ is H or $CH_3$; and
n is 2 or 3;
Q is $N(CH_3)_3$,

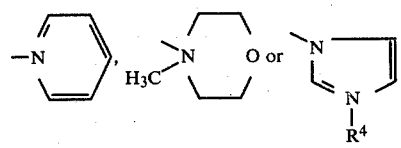

where $R^4$ is alkyl of 1-4 carbons, benzyl, monochlorobenzyl or monobromobenzyl; and
A is an anion.

The dyes are particularly useful in the dyeing of unbleached paper pulp and have excellent substantivity and desired fastness properties.

3 Claims, No Drawings

CATIONIC α-CYANO-P-(N-BENZYL-N-ETHYLAMINO)CINNAMOYL DYES

BACKGROUND OF THE INVENTION

1. Field of the Invention

This invention relates to cationic methine dyes for paper having excellent affinity for unbleached paper pulp.

2. Description of the Prior Art

Bauman, U.S. Pat. No. 3,742,012, discloses green-yellow pendant cationic dyes for paper having the structure:

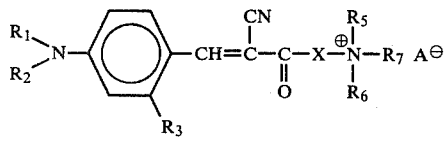

wherein each of $R_1$ and $R_2$ is lower alkyl or cyanoethyl, $R_3$ is H, methyl, methoxy or chloro, X is -O-alkylene or -NH-alkylene, $R_5$ is lower alkyl, $R_6$ is lower alkyl or cyclohexyl, $R_7$ is lower alkyl or benzyl and A is an anion. The dyes are stated to possess good substantivity on paper.

Buell et al, U.S. Pat. No. 4,017,486, discloses dyes that are structurally similar to the dyes of Bauman and which are stated to have improved storage stability, as compared to dyes of Bauman, in aqueous solutions of acetic acid at temperatures of about 50° C. The dyes of Buell et al are represented by the structure:

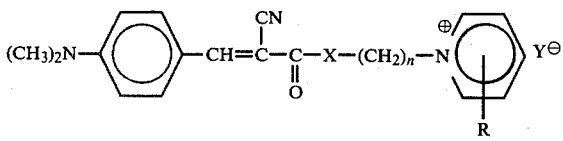

wherein R is hydrogen or methyl, X is O or NH, n is 2 or 3 and Y is an anion which is halide or methosulfate.

Dyes of even greater substantivity than those of Bauman and Buell et al, however, are desired to alleviate environmental problems relating to the discharge of so-called whitewater from processes for dyeing paper pulp.

According to the present invention, novel cationic α-cyano-p-(N-benzyl-N-ethylamino) cinnamoyl dyes have been found which have excellent affinity for unbleached paper pulp. The excellent affinity of the dyes permits almost complete utilization of color and results in essentially uncolored whitewater.

SUMMARY OF THE INVENTION

The present invention is directed to cationic α-cyano-p-(N-benzyl-N-ethylamino) cinnamoyl dyes represented by the structure:

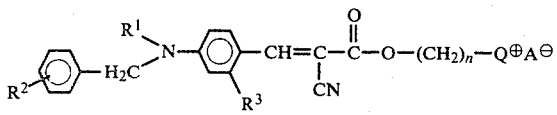

where $R^1$ is alkyl or cyanoalkyl, said alkyl being of 1–4 carbons;

$R^2$ is H, Cl, Br or $NO_2$;

$R^3$ is H or $CH_3$;

n is 2 or 3;

Q is $N(CH_3)_3$,

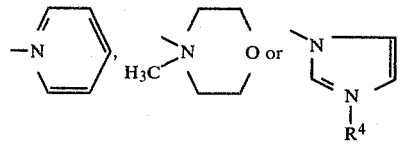

wherein $R_4$ is alkyl of 1–4 carbons, benzyl, monochlorobenzyl or monobromobenzyl; and A is an anion; preferably, chloride, bromide, methosulfate, ethosulfate or acetate.

The dyes are bright greenish yellow dyes which provide clean, bright solutions and have excellent affinity for paper pulp.

DESCRIPTION OF PREFERRED EMBODIMENTS

The cationic dyes according to the present invention may be prepared according to the general procedures described in the Bauman patent by reacting an aromatic aldehyde having the formula:

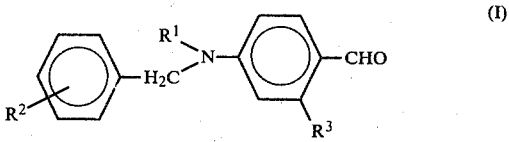

where $R^1$, $R^2$ and $R^3$ are as defined above, with an ester or amide of cyanoacetic acid of the formula:

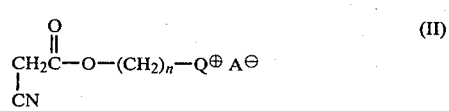

wherein Q, n and A are as defined above. Generally, the compounds of the formula (II) may be prepared by reacting cyanoacetic acid with acetic anhydride to form a mixed anhydride in situ and reacting the latter with a compound of the formula:

The resultant ester product is then condensed in situ with the aromatic aldehyde of formula (I). The reaction product is conveniently diluted with water to obtain a solution of the desired dye in acetic acid. Or, if desired, the dye may be isolated and subsequently dissolved, prior to use, in an aqueous solution of acetic acid or formic acid.

Preferred anions are selected from chloride, bromide, methosulfate, ethosulfate and acetate. Anions other than these may also be utilized, the nature of the anion being chosen, for example, according to the desired degree of solubility as will be appreciated by those skilled in the art.

Preferred dyes according to the invention are those wherein $R^1$ is $C_2H_5$, $R^2$ is H, n is 2, Q is $N(CH_3)_3$ and A is Cl or $OCOCH_3$. These dyes have been found to possess excellent affinity to unbleached paper pulp and to have good water solubility and storage stability.

The invention may be better understood by referring to the following illustrative examples.

EXAMPLE 1

Preparation of a liquid solution of the α-cyano-p-(N-benzyl-N-ethylamino)cinnamate of 1-(2-hydroxyethyl)-trimethyl-ammonium chloride.

19.3 parts of acetic anhydride were added to 5.4 parts of cyanoacetic acid and the reaction mixture was heated to 50° C. and maintained at this temperature for two hours. The reaction mixture was then cooled down to 40° C. and to it was added 9.7 parts of choline chloride. The reaction mixture was heated to 65° C. and maintained at this temperature for two hours. To this mixture was added 14.7 parts of p-(N-benzyl-N-ethylamino)benzaldehyde. The resultant mixture was slowly heated to a temperature of 90°–95° C. and maintained at this temperature for six hours. To the reaction mixture was added 8.5 parts of water and a temperature of 40° C. was maintained for one hour. The mixture was then cooled to room temperature and 6.1 parts of formic acid were added. The Resulting liquid dye was found to have good water solubility and good storage stability.

The aqueous solution of the dye absorbs in the visible region and shows the maximum absorption wavelength (λmax) at 440 nm.

Based on the above procedure, the structure of the dye is:

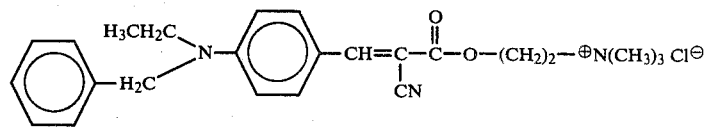

EXAMPLE 2

To evaluate the substantivity of the dyes according to the present invention as compared to structurally similar dyes of the Bauman and Buell et al patents, Groundwood Printing and Specialty Furnish was dyed according to the procedures described below. The dyes employed have the general structure.

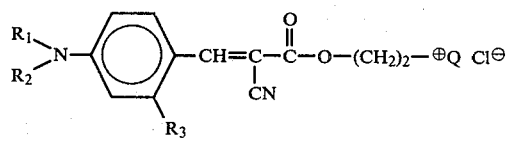

and are defined in Table I.

TABLE I

| Dye No. 1 | $R_1$ | $R_2$ | $R_3$ | Q |
|---|---|---|---|---|
| 1 | $C_2H_5$ | ⌬—$H_2C$ | H | $N(CH_3)_3$ |
| 2 | $C_2H_5$ | ⌬—$H_2C$ | $CH_3$ | $N(CH_3)_3$ |
| 3 (Bauman, Claim 2) | $C_2H_5$ | $C_2H_5$ | H | $N(CH_3)_3$ |

TABLE I-continued

| Dye No. 1 | $R_1$ | $R_2$ | $R_3$ | Q |
|---|---|---|---|---|
| 4 (Buell Claim 3) | $CH_3$ | $CH_3$ | H |  |

One thousand parts of Groundwood Printing & Specialty Furnish (a) (containing 85% groundwood and 15% bleached kraft pulp) were dispersed in 45000 parts of water. Ten parts of dye No. 1 and 10 parts of alum (commercial aluminum sulfate, $Al_2(SO_4)_3.18\ H_2O$) were added and the mixture was agitated for about 10 minutes. Paper sheet was then formed by conventional procedures to yield paper which was dyed a green-yellow shade. When an equivalent quantity of each of dyes Nos. 2–4 was applied in turn to groundwood printing and specialty furnish by the above procedure, greenish yellow dyeings of comparable strength were obtained. The amounts of dye in whitewater samples taken from each of the above dyeings, as a percentage of the total amount of dye added in each use, were visually estimated, by comparison with diluted samples of the original dye solutions, to be as follows:

|  | Dye in Whitewater |
|---|---|
| Dye No. 1 | 15–20% |
| Dye No. 2 | 20% |
| Dye No. 3 | 75% |
| Dye No. 4 | 85% |

One thousand parts of groundwood printing and specialty furnish (of the same make-up as (a)) were dispersed in 45000 parts of water. Ten parts of each of the four dyes were applied in turn to the furnish. All four were agitated about 10 minutes. Paper sheets were then formed by conventional procedures to yield paper which was dyed a green yellow shade. A whitewater sample was taken from each dyeing and was visually estimated as above, with the following results:

|  | Dye in Whitewater |
|---|---|
| Dye No. 1 | 10–15% |
| Dye No. 2 | 5–10% |
| Dye No. 3 | 50% |
| Dye No. 4 | 50–55% |

Although the percentage of dye remaining in the whitewater will vary depending on the composition of the pulp, dyeing procedures and the like, the dyes according to the present invention have significantly better affinity and produce whitewater containing significantly lower amounts of dye than commercial dyes of similar structure in all paper dyeings.

The scope of the present invention is defined by the appended claims.

What is claimed is:

1. A dye represented by the structure:
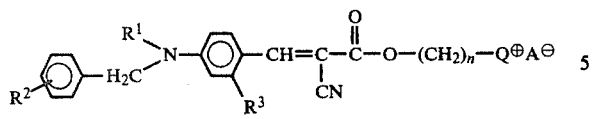
where
R¹ is alkyl or cyanoalkyl, said alkyl being of 1–4 carbons;
R² is H, Cl, Br or NO₂;
R³ is H or CH₃;
n is 2 or 3;
Q is N(CH₃)₃,
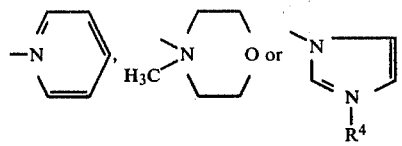
where R⁴ is alkyl of 1–4 carbons, benzyl, monochlorobenzyl or monobromobenzyl; and
A is an anion.
2. A dye represented by the structure
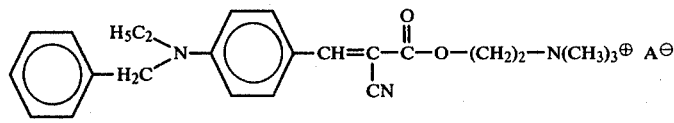
where A is an anion.
3. A dye represented by the structure
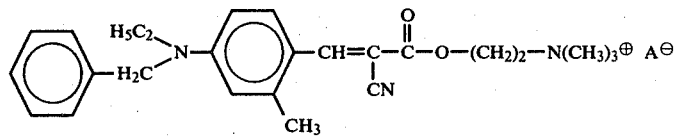
where A is an anion.

Notice of Adverse Decision in Interference

In Interference No. 100,750, involving Patent No. 4,235,806, K. A. Desai, CATIONIC ALPHA-CYANO-P- (N-BENZYL-N-ETHYLAMINO) CINNAMOYL DYES, final judgment adverse to the patentee was rendered Feb. 10, 1983, as to claims 1 and 2.

[*Official Gazette March 13, 1984.*]